(No Model.)
P. S. SMITH.
FERTILIZER AND SEED DISTRIBUTER.
No. 328,349. Patented Oct. 13, 1885.
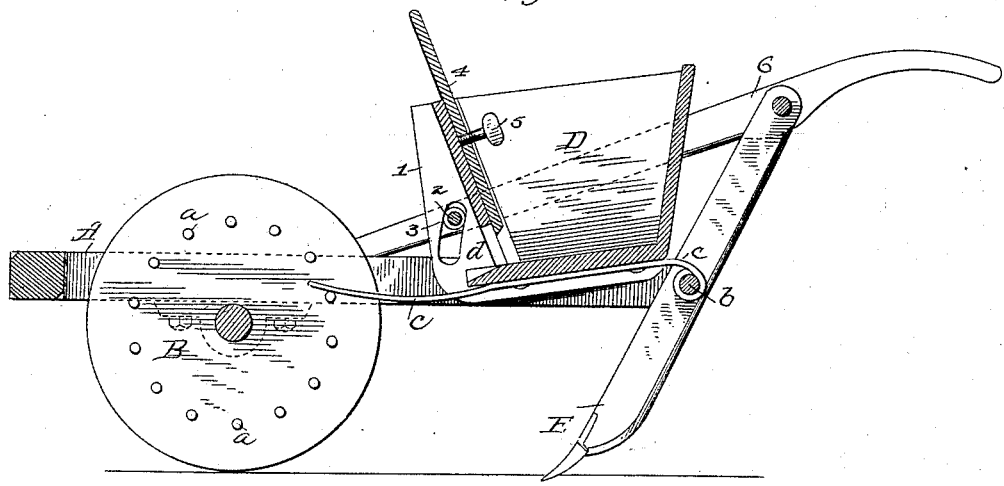
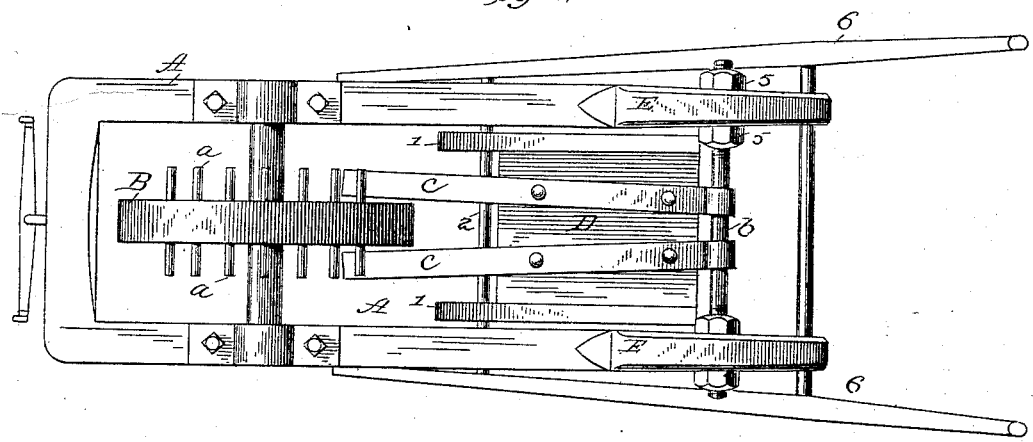
Attest:
Walter Donaldson
F. L. Middleton
Inventor
Presley S. Smith
by Joyce & Speer
Att'ys

UNITED STATES PATENT OFFICE.

PRESLEY S. SMITH, OF KNOXVILLE, GEORGIA, ASSIGNOR OF ONE-HALF TO J. W. JONES, OF SAME PLACE.

FERTILIZER AND SEED DISTRIBUTER.

SPECIFICATION forming part of Letters Patent No. 328,349, dated October 13, 1885.

Application filed November 10, 1884. Serial No. 147,586. (No model.)

*To all whom it may concern:*

Be it known that I, PRESLEY SAMUEL SMITH, of Knoxville, in the county of Crawford and State of Georgia, have invented a new and useful Improvement in Fertilizer and Seed Distributers; and I do hereby declare that the following is a full, clear, and exact description of the same.

My invention relates to apparatus used for distributing fertilizing material—such as guano, bone-dust, &c.—and is an improvement on that class of machines known as "walking" distributers.

The object of my invention is to give to the box or receptacle containing the fertilizer a positive and quick movement up and down at regular intervals, so that the material will be shaken from the box through suitable discharge-opening in uniform quantities. Another object is to provide means for covering the freshly-dropped material in order that none of its fertilizing properties will be lost by undue exposure to the air.

The main structure of the apparatus consists of a carrying wheel or disk having bearings in suitable side beams, which extend rearward to form handles, of a box or receptacle for the fertilizing material supported upon arms pivoted in the rear part of the frame of the machine, said arms extending forward a sufficient distance to be in the path of a series of pins secured to the faces of the disk or wheel, whereby a quick vertical movement is given the receptacle for the purpose of discharging a portion of the material therefrom.

My invention consists of various details of construction hereinafter described, and particularly claimed.

In the accompanying drawings, Figure 1 is a longitudinal section through the box or receptacle, the carrying-wheel being shown in side elevation. Fig. 2 is a plan view.

The main supporting-frame of the machine consists of beams or side bars, A A, preferably formed of wood or other suitable material. In the forward part of the frame is mounted a carrying wheel or disk, B, upon which the principal weight of the apparatus rests when in operation. In the faces of the disk are set pins $a\ a'$, arranged equidistant from the center and from each other. On a cross-bar, $b$, at the rear part of the frame are pivoted arms $c\ c$, preferably of spring metal. These arms extend horizontally forward and rest upon the pins $a\ a'$ on either side of the disk B. The bearing ends of the arms $c\ c$ are slightly upturned, and are made sufficiently long and broad to give a good bearing-surface on the pin. These arms $c\ c$ support the box or receptacle D, which contains the fertilizer material. The box may be secured to the arms by bolts or screws, and is provided with a discharge-opening, $d$.

It will be readily seen that as the apparatus is moved forward the revolution of the wheel B will cause each pair of pins $a\ a'$ to support and raise the arms $c\ c$ until the revolution of the wheel will have carried the pins beyond the ends of the arms. At this point the arms will fall until they strike the next pair of pins with the same action. Thus the hopper is given a quick and positive movement up and down, and as the pins are placed equidistant from each other the shaking movement will be at certain intervals and with uniform force, thus discharging from the hopper the material in uniformly-regulated quantities.

The box is provided with flanges 1 1 on its front side, which are slotted to receive a guide rod or bar, 2. This bar extends transversely across the machine, and has friction-rollers 3 3, situated within the slots 1 1, so as to steady and guide the box in its movement up and down.

The discharge-opening may be regulated in regard to size by means of the slide and set-screw 4 5.

I do not of course wish to limit my apparatus to its use as a fertilizer-distributer, as obviously it may be used as a planter for large grains—such as corn, &c.—with equally good effect.

The shovels E E are secured to the cross-bar just in rear of the box, so that the material or seed is covered as soon as dropped from the hopper. The shovels are adjusted laterally by means of nuts, as shown at 5 5.

The main beams are provided with handles 6 6, and by these the machine may be properly guided when a horse is used; or in light soil the machine may be propelled barrow-fashion by means of these.

I am aware that it is old to employ arms or bars in connection with a revolving disk or wheel carrying pins upon its faces for the purpose of agitating the contents of the hopper, and I do not wish to claim this arrangement; and I wish also to disclaim the principle and operation of a supplemental shoe or spout adapted to vibrate beneath the hopper and so discharge the contents.

Having thus described my invention, what I claim is—

The combination, in a fertilizer or seed distributer, of a frame, a hopper pivoted at its rear, a wheel or disk having projecting pins on its faces, bars supporting the front of the hopper and resting upon the pins, whereby vertical vibration is given thereto, and a guide-rod secured to the sides of the frame and passing through guide-slots in the sides of the hopper, all substantially as described.

In testimony whereof I have signed my name to this specification in the presence of two subscribing witnesses.

his
PRESLEY S. × SMITH.
      mark.

Witnesses:
 JOHN A. KENDRICK,
 BICHAT LE SUEUR.